United States Patent
Kang

(10) Patent No.: US 11,321,170 B2
(45) Date of Patent: May 3, 2022

(54) MEMORY SYSTEM, MEMORY CONTROLLER, AND METHOD FOR OPERATING MEMORY SYSTEM

(71) Applicant: SK hynix Inc., Gyeonggi-do (KR)

(72) Inventor: Chul Sung Kang, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 78 days.

(21) Appl. No.: 16/910,774

(22) Filed: Jun. 24, 2020

(65) Prior Publication Data

US 2021/0248032 A1 Aug. 12, 2021

(30) Foreign Application Priority Data

Feb. 11, 2020 (KR) .................. 10-2020-0016167

(51) Int. Cl.
*G11C 29/00* (2006.01)
*G06F 11/10* (2006.01)
*G06F 11/30* (2006.01)
*G06F 11/07* (2006.01)

(52) U.S. Cl.
CPC ...... *G06F 11/1068* (2013.01); *G06F 11/0757* (2013.01); *G06F 11/0772* (2013.01); *G06F 11/3058* (2013.01)

(58) Field of Classification Search
CPC ............. G06F 11/1068; G06F 11/3058; G06F 11/0757; G06F 11/0772
See application file for complete search history.

(56) References Cited

U.S. PATENT DOCUMENTS

| 9,947,401 | B1* | 4/2018 | Navon | G06F 11/0727 |
| 2013/0332753 | A1* | 12/2013 | Varma | G06F 1/3296 |
| | | | | 713/300 |
| 2015/0241944 | A1* | 8/2015 | Allen-Ware | G06F 1/3287 |
| | | | | 713/320 |
| 2016/0293264 | A1* | 10/2016 | Al-Shamma | G11C 5/14 |

FOREIGN PATENT DOCUMENTS

KR 10-2017-0027556 3/2017
KR 10-2019-0085770 7/2019

* cited by examiner

*Primary Examiner* — Samir W Rizk
(74) *Attorney, Agent, or Firm* — IP & T Group LLP

(57) ABSTRACT

Embodiments of the present disclosure relate to a memory system, a memory controller, and a method for operating a memory system. According to embodiments of the present disclosure, a memory system may configure first peak power management information for controlling the plurality of memory dies, may determine, when an error occurs while controlling a plurality of memory dies, new peak power management information corresponding to operation information and environment information at the time at which the error occurs, respectively, and may change from the first peak power management information to the second peak power management information according to subsequent operation information and environment information. Accordingly, the memory system is capable of minimizing the possibility of occurrence of errors in a read, write, or erase operation and increasing the stability of an operation for transmitting and receiving commands or data to and from the host.

17 Claims, 15 Drawing Sheets

FIG.9 read operation

| time(us) | current (mA) |
|---|---|
| 0 | 120 |
| 30 | 90 |
| 50 | 80 |
| 75 | 70 |
| ... | ... | write operation

| time(us) | current (mA) |
|---|---|
| 0 | 140 |
| 60 | 95 |
| 90 | 85 |
| 115 | 60 |
| ... | ... | erase operation

| time(us) | current (mA) |
|---|---|
| 0 | 130 |
| 200 | 105 |
| 300 | 90 |
| 400 | 75 |
| ... | ... |

PPM_INFO_1
FIG.12a   DIE0 ~ DIE3
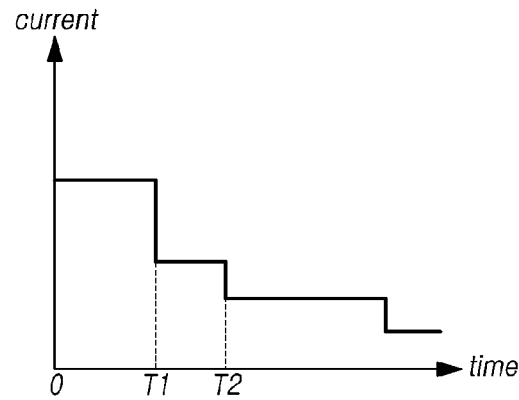
FIG.12b   DIE4 ~ DIE5
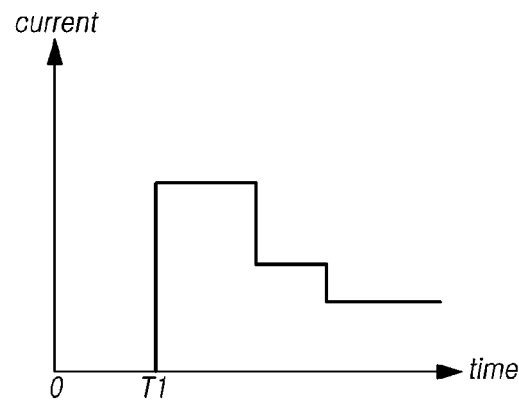
FIG.12c   DIE6 ~ DIE7
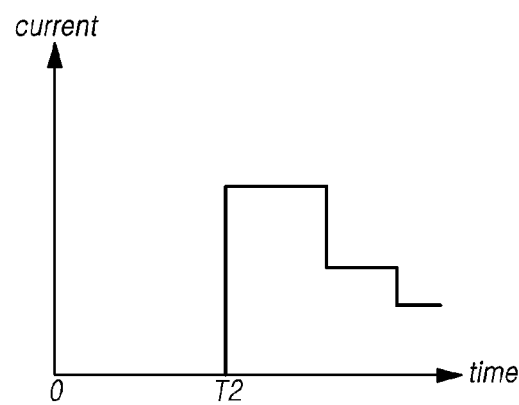

DIE0 ~ DIE1

DIE2 ~ DIE3

DIE4 ~ DIE5

DIE6 ~ DIE7

MEMORY SYSTEM, MEMORY CONTROLLER, AND METHOD FOR OPERATING MEMORY SYSTEM

CROSS REFERENCE TO RELATED APPLICATION

The present application claims priority under 35 U.S.C. 119(a) to Korean patent application number 10-2020-0016167, filed on Feb. 11, 2020, which is incorporated herein by reference in its entirety.

BACKGROUND

1. Field of the Invention

Embodiments of the present disclosure relate to a memory system, a memory controller, and a method for operating the memory system.

2. Description of the Prior Art

A memory system, e.g., a storage device, stores data on the basis of a request from a host, such as a computer, a mobile terminal (for example, a smartphone or a tablet), or any of various other electronic devices. The memory system may be of the type configured to store data in a magnetic disk such as a hard disk drive (HDD), or of the type configured to store data in a nonvolatile memory such as a solid state drive (SSD), a universal flash storage device (UFS), or an embedded MMC (eMMC) device.

The memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

When performing a read, write, or erase operation on the memory device, the memory system may perform control such that the power consumed by the memory system does not exceed a set peak power value. This is because, if the power consumed by the memory system exceeds a peak power value, errors are likely to occur while the memory system is operating.

SUMMARY

Embodiments of the present disclosure may provide a memory system, a memory controller, and a method for operating a memory system capable of minimizing the probability of occurrence of an error in a read, write, or erase operation.

In addition, embodiments of the present disclosure may provide a memory system, a memory controller, and a method for operating a memory system capable of increasing the stability of an operation of transmitting and receiving commands or data to and from a host.

In one aspect, embodiments of the present disclosure may provide a memory system including a plurality of memory dies and a memory controller configured to control the plurality of memory dies.

The memory controller may configure first peak power management information for controlling a plurality of memory dies.

When an error occurs while controlling a plurality of memory dies on the basis of the first peak power management information, the memory controller may determine second peak power management information corresponding to operation information and environment information at a first time, which is the time at which the error occurs, respectively.

In this case, the error may be an error that occurs during the operation of transmitting commands or data to a host, or during an operation of receiving commands or data from the host.

In this case, the environment information may include at least one of temperature information, operation speed information of a host, and power level information.

In this case, the operation information may indicate one of a read operation, a write operation, and an erase operation.

When it is determined, at a second time after a first time, that the operation information and the environment information at the second time correspond to the operation information and the environment information, respectively, at the first time, the memory controller may change from the first peak power management information to the second peak power management information. When the operation information at the first time matches the operation information at the second time, and when the difference between the environment information at the first time and the environment information at the second time falls within a set range, the memory controller may determine that the operation information and the environment information at the second time correspond to the operation information and the environment information, respectively, at the first time.

The memory controller may determine the second peak power management information such that a value of a second peak current, which is a peak current usable for each memory die when controlling a plurality of memory dies on the basis of the second peak power management information, is greater than a value of a first peak current, which is a peak current usable for each memory die when controlling a plurality of memory dies on the basis of the first peak power management information.

The memory controller may determine the second peak power management information such that the maximum number of memory dies that can be simultaneously operated by a peak current when controlling a plurality of memory dies on the basis of the second peak power management information is less than the maximum number of memory dies that can be simultaneously operated by a peak current when controlling a plurality of memory dies on the basis of the first peak power management information.

In another aspect, embodiments of the present disclosure may provide a memory controller including a memory interface configured to communicate with a plurality of memory dies and a control circuit configured to control the plurality of memory dies.

The control circuit may configure first peak power management information for controlling a plurality of memory dies.

When an error occurs while controlling a plurality of memory dies on the basis of the first peak power management information, the control circuit may determine second peak power management information corresponding to operation information and environment information, respectively, at a first time, which is the time at which the error occurs.

In this case, the error may be an error that occurs during the operation of transmitting commands or data to a host, or during an operation of receiving commands or data from the host.

In this case, the environment information may include at least one of temperature information, operation speed information of a host, and power level information.

In this case, the operation information may indicate one of a read operation, a write operation, and an erase operation.

When it is determined, at a second time after a first time, that the operation information and the environment information at the second time correspond to the operation information and the environment information at the first time, respectively, the control circuit may change from the first peak power management information to the second peak power management information. When the operation information at the first time matches the operation information at the second time, and when the difference between the environment information at the first time and the environment information at the second time falls within a set range, the control circuit may determine that the operation information and the environment information at the second time correspond to the operation information and the environment information, respectively, at the first time.

The control circuit may determine the second peak power management information such that a value of a second peak current, which is a peak current usable for each memory die when controlling a plurality of memory dies on the basis of the second peak power management information, is greater than a value of a first peak current, which is a peak current usable for each memory die when controlling a plurality of memory dies on the basis of the first peak power management information.

The control circuit may determine the second peak power management information such that the maximum number of memory dies that can be simultaneously operated by a peak current when controlling a plurality of memory dies on the basis of the second peak power management information is less than the maximum number of memory dies that can be simultaneously operated by a peak current when controlling a plurality of memory dies on the basis of the first peak power management information.

In still another aspect, a method for operating a memory system may include a step of configuring first peak power management information for controlling a plurality of memory dies.

The method may include a step of, when an error occurs while controlling a plurality of memory dies on the basis of first peak power management information, determining second peak power management information corresponding to operation information and environment information at a first time, which is the time at which the error occurs.

The method may include a step of determining, at a second time after a first time, whether or not the operation information and the environment information at the second time correspond to the operation information and the environment information, respectively, at the first time.

The method may include a step of changing from the first peak power management information to the second peak power management information when it is determined that the operation information and the environment information at the second time correspond to the operation information and the environment information, respectively, at the first time.

In still another aspect, embodiments of the present disclosure may provide a memory system including a plurality of memory dies; and a controller coupled to the plurality of memory dies.

The controller may perform, during a first time period, a first operation on the plurality of memory dies based on first peak power management information.

When an error occurs while performing the first operation, the controller may change from the first peak power management information to second peak power management information based on the first operation and environment information of the memory system during the first time period.

The controller may perform, during a second time period, a second operation on the plurality of memory dies based on the second peak power management information, when the first operation is the same as the second operation and the environment information of the memory system during the first time period is substantially the same as environment information of the memory system during the second time period.

The first and second peak power management information may be associated with peak power for the plurality of memory dies.

According to embodiments of the present disclosure, it is possible to minimize the probability of occurrence of an error in a read, write, or erase operation.

In addition, according to embodiments of the present disclosure, it is possible to increase the stability of an operation of transmitting and receiving commands or data to and from the host.

BRIEF DESCRIPTION OF THE DRAWINGS

The above and other aspects, features and advantages of the present disclosure will be more apparent from the following detailed description taken in conjunction with the accompanying drawings, in which:

FIG. 9 is a diagram illustrating an example of peak power management information according to an embodiment of the present disclosure;

FIGS. 12a to 12c are diagrams illustrating an example in which a memory system controls a plurality of memory dies on the basis of first peak power management information, according to an embodiment of the present disclosure;

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s).

Figure 1:
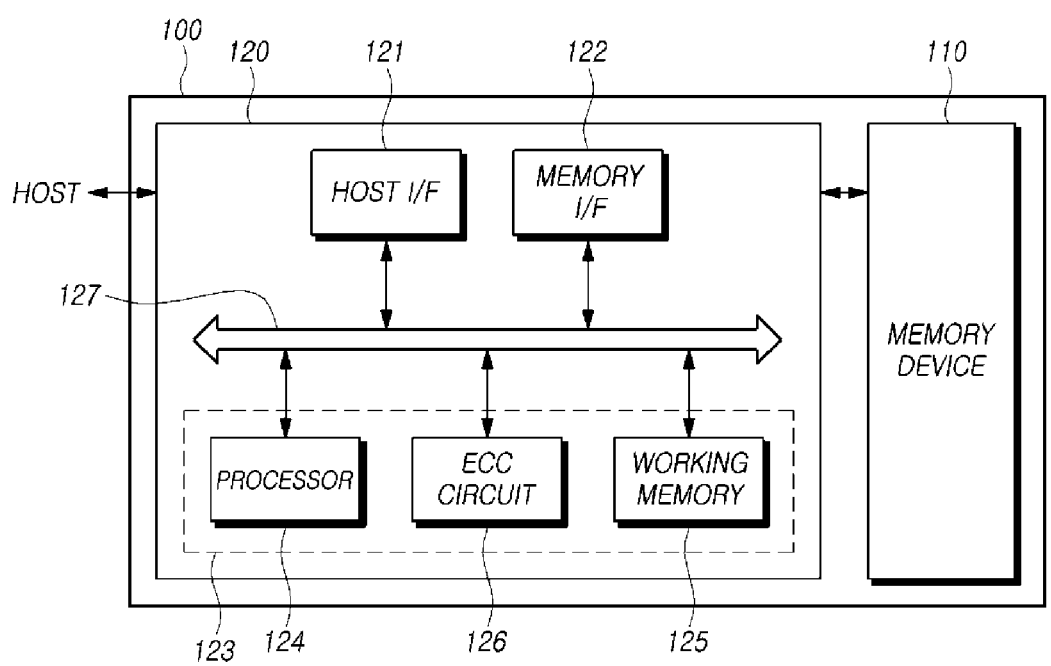
FIG. 1 is a schematic diagram illustrating a configuration of a memory system according to an embodiment of the present disclosure.

FIG. 1 is a schematic diagram illustrating a configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation") and an erase operation.

The memory device 110 may include a memory cell array including multiple memory cells (also simply referred to as "cells") configured to store data. The memory cell array may exist inside a memory block.

For example, the memory device 110 may be implemented by any of various types of memories, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array, which is selected by the address. That is, the memory device 110 may perform an operation corresponding to the received command in a memory area of the memory device having a physical address corresponding to the received address from the controller.

For example, the memory device 110 may perform a program operation, a read operation and an erase operation. During the program operation, the memory device 110 may program data in the area selected by the address. During the read operation, the memory device 110 may read data from the area selected by the address. During the erase operation, the memory device 110 may erase data stored in the area selected by the address.

The memory controller 120 may control write (or program), read, erase, and background operations with regard to the memory device 110. The background operation may include, for example, a garbage collection operation (GC), a wear leveling (WL) operation, and/or a bad block management (BBM) operation.

The memory controller 120 may control the operation of the memory device 110 at the request of a host. Alternatively, the memory controller 120 may control the operation of the memory device 110 in the absence of a request of the host, such as, for example, when it performs one or more background operations of the memory device 110.

The memory controller 120 and the host may be separate devices. In another embodiment, the memory controller 120 and the host may be integrated and implemented as a single device. In the following description, the memory controller 120 and the host are separate devices.

In FIG. 1, the memory controller 120 may include a host interface (I/F) 121, a memory interface 122 and a control circuit 123.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations for overall control of the memory controller 120. For example, the control circuit 123 may include a processor 124 and a working memory 125. The control circuit 123 may further include an error detection and correction circuit (i.e., ECC circuit) 126.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 using a derandomizing seed. The derandomized data may be output to the host.

The processor 124 may execute firmware (FW) so as to control the operation of the memory controller 120. In other words, the processor 124 may control overall operation of the memory controller 120 and, in order to perform a logical operation, may execute (or drive) firmware loaded into the working memory 125 during booting.

The firmware refers to a program executed inside the memory system 100, and may include various functional layers.

For example, the firmware may include a flash translation layer (FTL), a host interface layer (HIL) and/or a flash interface layer (FIL). As described above, the flash translation layer is configured to translate between a logical address received from the host and a physical address of the memory device 110. The host interface layer is configured to interpret a command that the host issues to the memory system 100 (or storage device) and to deliver the same to the FTL. The flash interface layer is configured to deliver a command issued by the FTL to the memory device 110.

For example, the firmware may be stored in the memory device 110, and then loaded into the working memory 125.

The working memory 125 may store firmware, program codes, commands, or pieces of data to drive the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect an error bit of target data using an error correction code, and to correct the detected error bit. For example, the target data may be data stored in the working memory 125, or data retrieved from the memory device 110.

The error detection/correction circuit 126 may be implemented to decode data using the error correction code. The error detection/correction circuit 126 may be implemented using various code decoders. For example, the error detection/correction circuit 126 may be implemented with a decoder that performs nonsystematic code decoding or a decoder that performs systematic code decoding.

For example, the error detection/correction circuit 126 may detect an error bit, sector by sector, with regard to each piece of read data. That is, each piece of read data may include multiple sectors. As used herein, a sector may refer to a data unit smaller than the read unit (i.e., page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than the reference value, the error detection/correction circuit 126 may determine that the corresponding sector is correctable or "a pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. someone or more of the above-mentioned constituent elements may be omitted, and/or one or more of such elements may be integrated into a single element. Also, in some cases, one or more other constituent elements may be added, in addition to the above-mentioned constituent elements of the memory controller 120.

Hereinafter, the memory device 110 is described in more detail with reference to FIG. 2.

Figure 2:
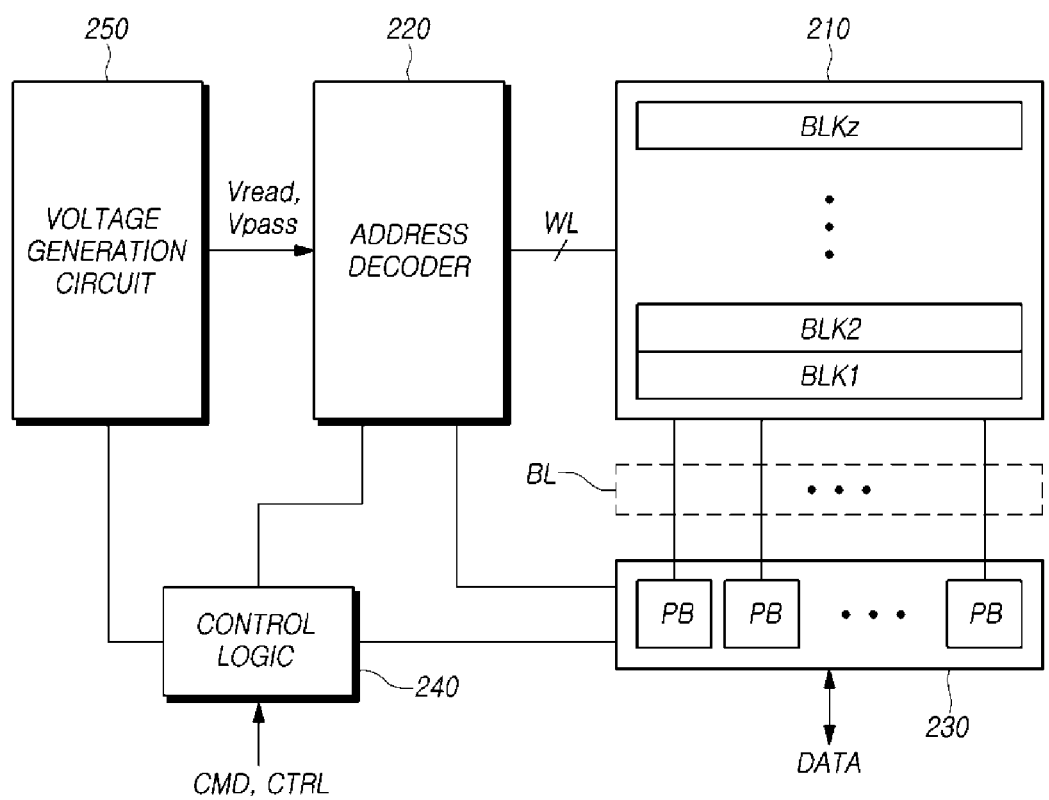
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read/write circuit 230, control logic 240, and a voltage generation circuit 250.

The memory cell array 210 may include multiple memory blocks BLK1-BLKz (where z is a natural number greater than or equal to 2).

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells in the memory cell array 210 may be a single-level cell (SLC) configured to store one bit of data, a multi-level cell (MLC) configured to store two bits of data, or a triple-level cell (TLC) configured to store three bits of data. As another example, each of the multiple memory cells in the memory cell array 210 may be a quad-level cell (QLC) configured to store four bits of data. As another example, the memory cell array 210 may include multiple memory cells, each of which may be configured to store at least five bits of data.

In FIG. 2, the address decoder 220, the read/write circuit 230, the control logic 240, and the voltage generation circuit 250 may cooperatively operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer (not shown) inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block and may apply the pass voltage Vpass to the remaining non-selected word lines WL.

During a program verification operation, the address decoder 220 may apply a verification voltage generated by the voltage generation circuit 250 to a selected word line WL inside a selected memory block and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include a block decoder, a row decoder, a column decoder, and/or an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The read/write circuit 230 is also referred to as a page buffer circuit including multiple page buffers PB, or a data register circuit. The read/write circuit 230 may include a data buffer that participates a data processing function and, in some cases, may further include a cache buffer that participates in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
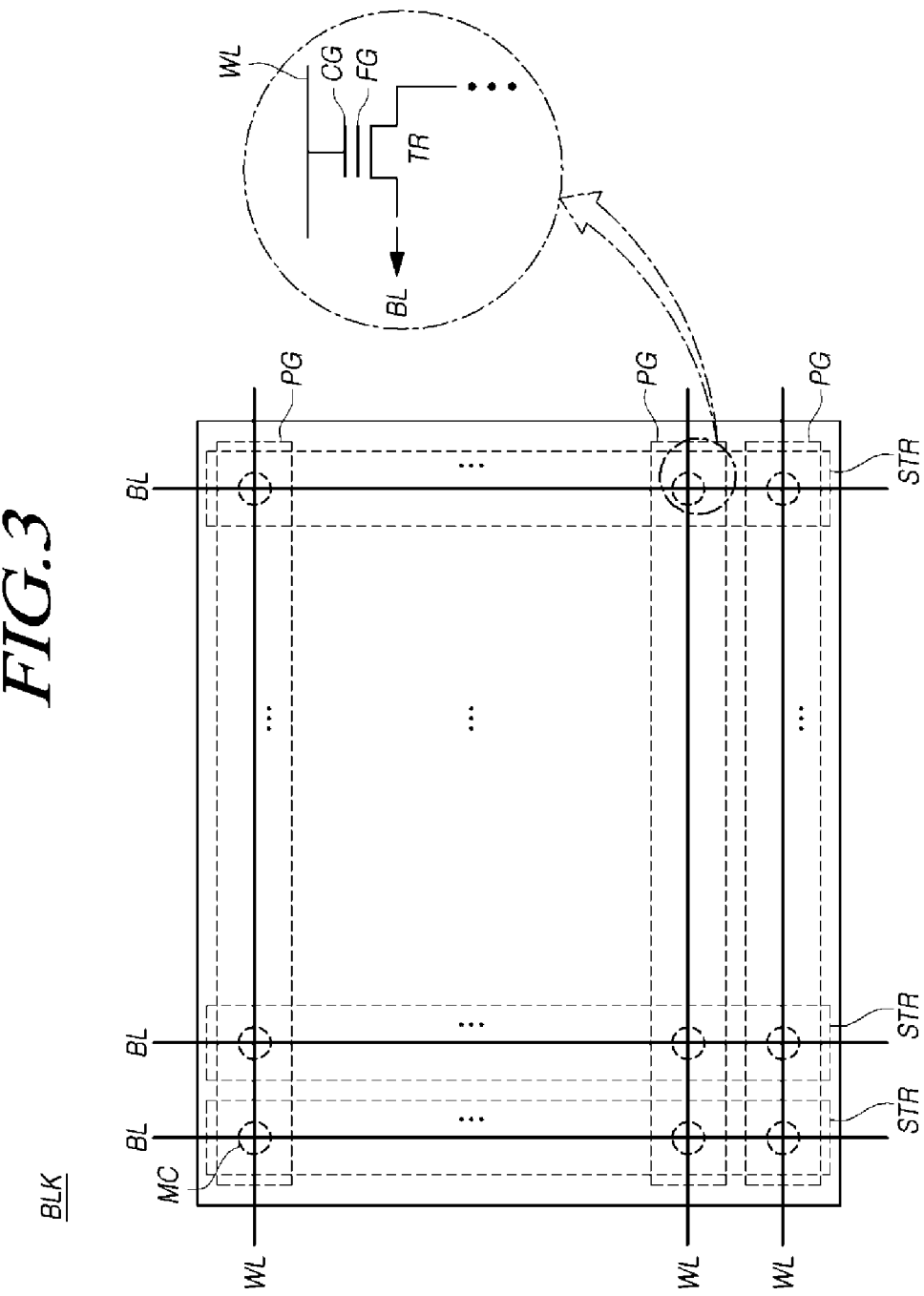
FIG. 3 is a diagram schematically illustrating a memory block of a memory device according to an embodiment of the present disclosure.

FIG. 3 is a diagram schematically illustrating a memory block BLK of a memory device 110 according to an embodiment of the present disclosure.

Referring to FIG. 3, the memory block BLK may be arranged and configured such that multiple pages PG and multiple strings STR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

In the case of a memory block structure as illustrated in FIG. 3, a read operation and a program operation (or write operation) may be performed page by page, and an erase operation may be performed memory block by memory block.

Figure 4:
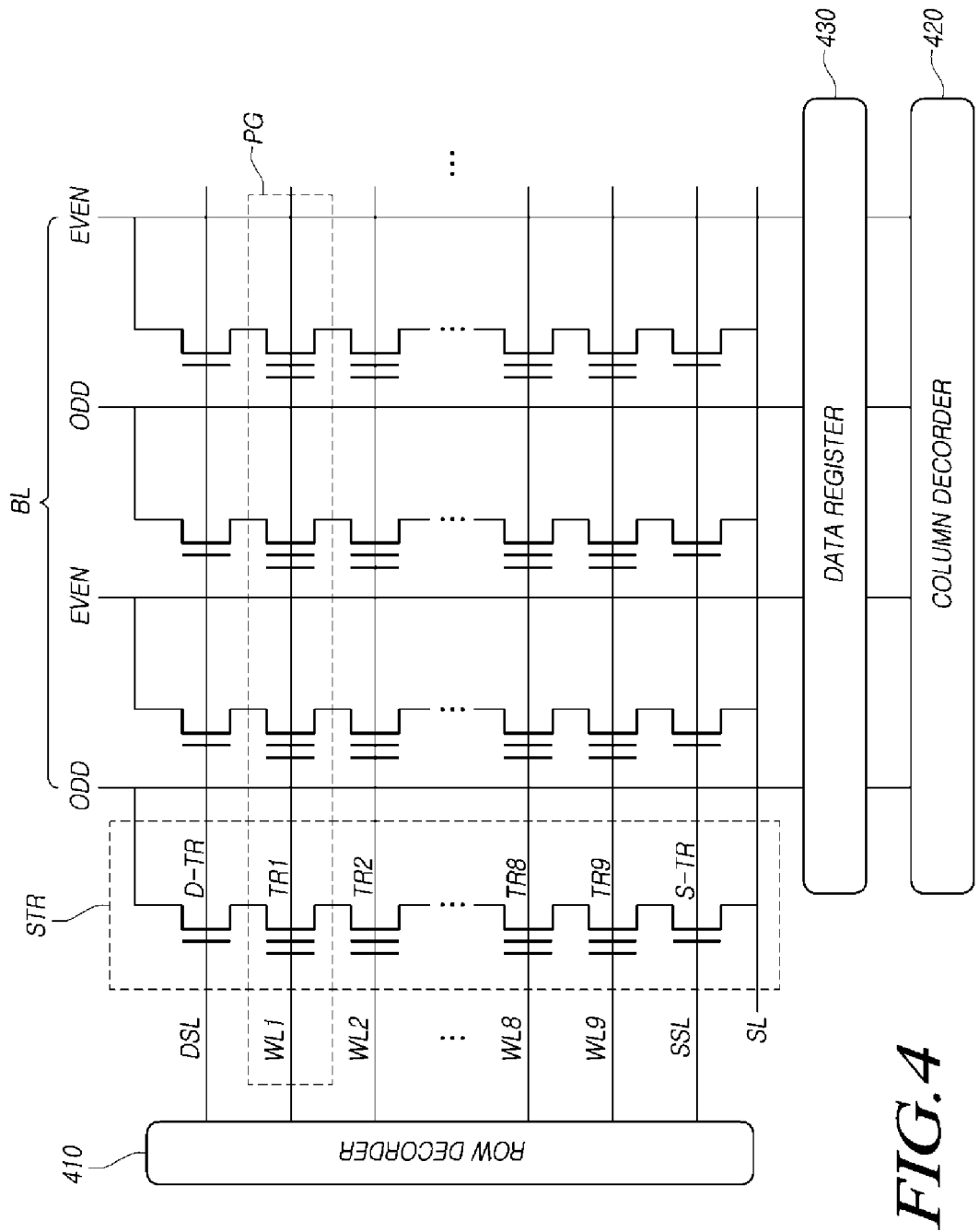
FIG. 4 is a diagram illustrating a structure of word lines and bit lines of a memory device according to an embodiment of the present disclosure.

FIG. 4 is a diagram illustrating a structure of word lines WL and bit lines BL of a memory device 110 according to an embodiment of the present disclosure.

Referring to FIG. 4, the memory device 110 has a core area in which memory cells MC are concentrated, and an auxiliary area which corresponds to the remaining area other than the core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 420 while distinguishing between odd-numbered bit lines BL and even-numbered bit lines BL.

For accessing a memory cell MC, the address may be entered to the core area first through the input/output end and then through the row decoder 410 and the column decoder 420 such that a corresponding target memory cell can be designated. As used herein, designating a target memory cell refers to accessing one of the memory cells MC at a site of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC in the middle position or last position among memory cells MC connected in series may slightly differ from the voltage applied to the memory cell MC in the first position and from the voltage applied to the memory cell MC in the last position, due to the voltage drop across the preceding memory cell MC.

The data register 430 plays an important role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade overall performance of the memory device 110.

In the example illustrated in FIG. 4, in one string STR, multiple transistors TR1-TR9 connected to multiple word lines WL1-WL9 may exist. The areas in which the multiple transistors TR1-TR9 exist correspond to memory cells MC. As used herein, the multiple transistors TR1-TR9 refer to transistors including control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned on both ends of the corresponding string STR and deliver/block signals.

The memory system 100 needs to fill the target memory cell MC of the bit line BL to be programmed with electrons during a program operation. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may supply a voltage (for example, +20V) to the substrate through a source line SL during an erase operation. The memory system 100 floats both the first selection transistor D-TR and the second selection transistor S-TR during an erase operation, thereby generating an infinite resistance. As a result, the role of the first selection transistor D-TR and that of the second selection transistor S-TR may be removed, and electrons may operate only between the floating gate FG and the substrate due to the potential difference.

Figure 5:
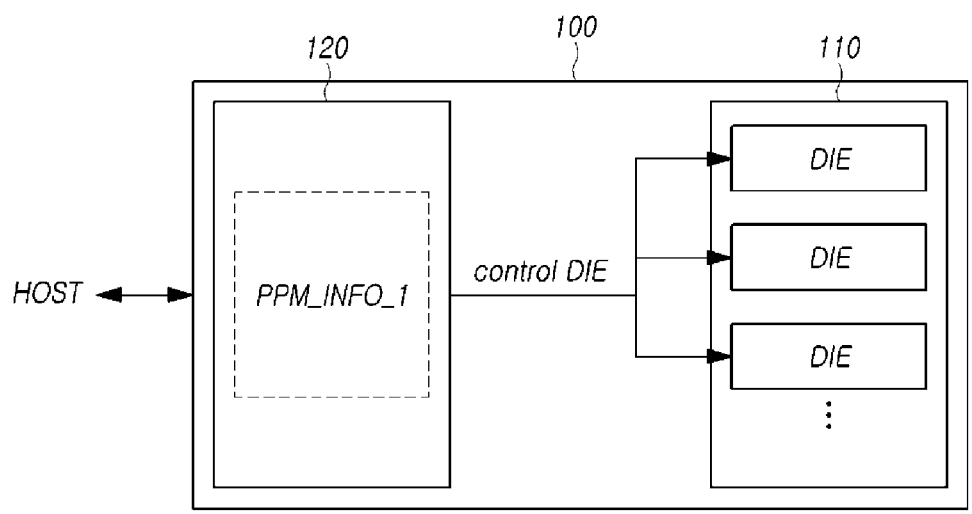
FIG. 5 is a diagram illustrating an operation in which a memory system controls a plurality of memory dies on the basis of first peak power management information, according to an embodiment of the present disclosure.

FIG. 5 is a diagram illustrating an operation in which a memory system 100 controls a plurality of memory dies (each individually identified as DIE) on the basis of first peak power management information PPM_INFO_1, according to an embodiment of the present disclosure.

Referring to FIG. 5, a memory controller 120 of the memory system 100 may control a plurality of memory dies. The plurality of memory dies may be included in the memory device 110. In addition, each memory die DIE may include one or more memory blocks.

The memory controller 120 may control the plurality of memory dies on the basis of peak power management information. The peak power management information is used to manage a peak power that is the maximum value of power consumed by the respective memory dies when the memory system 100 executes a specific operation (e.g., a read operation/a write operation/an erase operation). Since power is determined by time and current consumption, the peak power management information may indicate a value of the current consumed by each memory die DIE when performing a specific operation.

The peak power management information may be managed in any of various formats (e.g., a table structure). An example of a format of the peak power management information is described with reference to FIG. 9 below.

The memory controller 120 may configure the peak power management information for controlling a plurality of memory dies as first peak power management information PPM_INFO_1.

The memory controller 120 may change the peak power management information if a specific condition is satisfied. Hereinafter, an operation in which the memory controller 120 changes the peak power management information is described.

Figure 6:
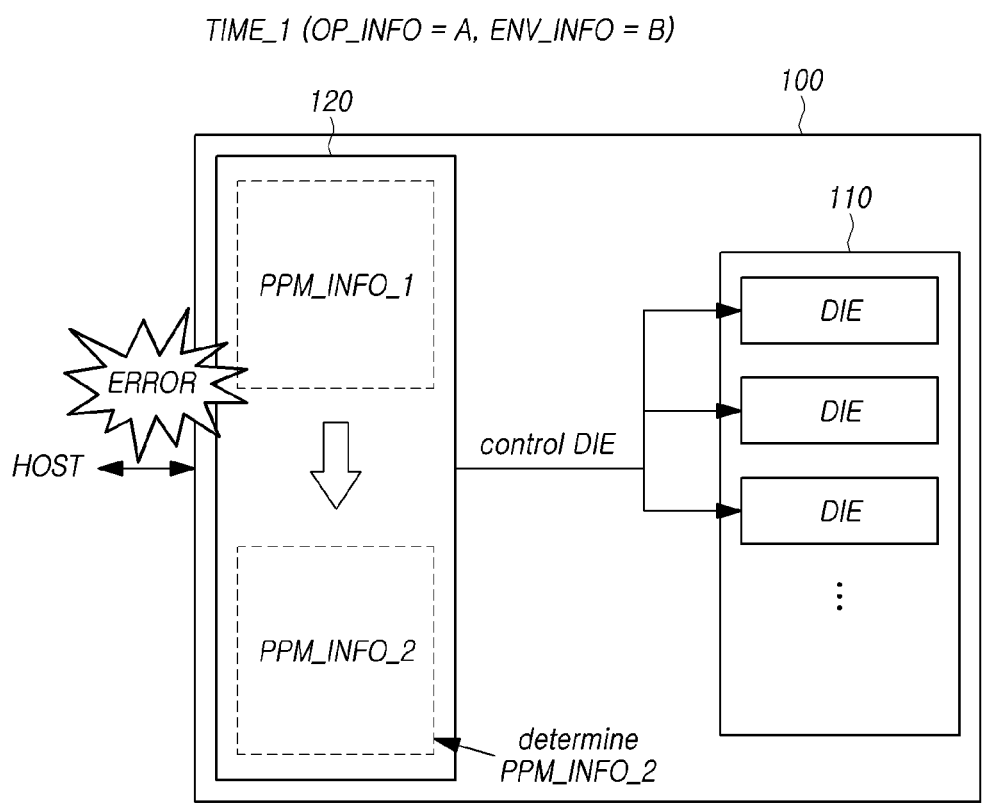
FIG. 6 is a diagram illustrating an operation in which a memory system determines second peak power management information, according to an embodiment of the present disclosure.

FIG. 6 is a diagram illustrating an operation in which a memory system 100 determines second peak power management information PPM_INFO_2, according to an embodiment of the present disclosure.

When an error occurs while controlling a plurality of memory dies on the basis of first peak power management information PPM_INFO_1, a memory controller 120 of the memory system 100 may determine second peak power management information PPM_INFO_2 corresponding to operation information OP_INFO "A" and environment information ENV_INFO "B" at the time at which the error occurs. In this case, it is assumed that the time at which the error occurs is a first time TIME_1.

In this case, the operation information OP_INFO indicates the operation that the memory controller 120 is performing on the plurality of memory dies. For example, the operation information OP_INFO may indicate that a read operation, a write operation, or an erase operation is being performed.

In addition, the environment information ENV_INFO indicates an operation environment of the memory system 100. For example, the environment information ENV_INFO may include one or more of temperature information, operation speed information of a host, and power level information.

The temperature information indicates the temperature of the memory system 100. The memory controller 120 may obtain temperature information through a separate temperature sensor positioned inside or outside the memory system 100.

The operation speed information of a host indicates the speed at which the host operates, and may be represented as a clock speed (e.g., 1 GHz) of the host. The memory controller 120 may obtain the operation speed information of a host on the basis of a command received from the host.

The power level information indicates the level of a value of power supplied to the memory system 100. The power level information may indicate a range of power supplied to the memory system 100 belongs, among one or more ranges (e.g., 2.0V to 2.2V, 2.2V to 2.4V, and 2.4V to 2.6V).

The error described above may be an error occurring during an operation of transmitting and receiving commands or data to and from the host. In other words, an error may occur when the command or data received from the host is different from an expected value or when the command or data is being transmitted to the host.

The memory controller 120 may determine new peak power management information in the case where an error occurs during the operation of transmitting commands or data to, or receiving commands and data from, the host, whereas the memory controller 120 may not determine new peak power management information in the case where an error occurs regardless of activity of the host. The error occurring during the operation of transmitting commands or data between the host as described above may also be referred to as a "data link error".

As described above, when an error occurs during command/data transmission, the memory controller 120 determines new peak power management information for the following reasons.

The error occurring during command/data transmission is likely to occur when the memory system 100 instantaneously consumes power higher than a reference value. When such an error occurs, the memory system 100 retries the transmission operation.

If the frequency of error occurrence increases, the frequency of the memory system 100 retrying the transmission operation also increases, which leads to degradation in performance of the memory system 100. Therefore, the memory controller 120 of the memory system 100 may determine new peak power management information to reduce the frequency of occurrence of the error, thereby increasing the stability of the command/data transmission operation.

Figure 7:
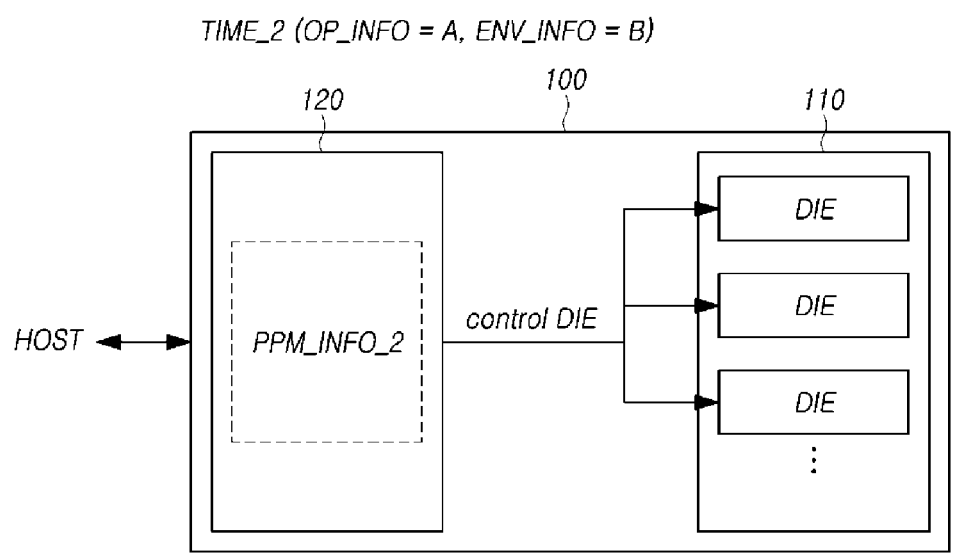
FIG. 7 is a diagram illustrating an operation in which a memory system controls a plurality of memory dies on the basis of second peak power management information, according to an embodiment of the present disclosure.

FIG. 7 is a diagram illustrating an operation in which a memory system 100 controls a plurality of memory dies on the basis of second peak power management information PPM_INFO_2, according to an embodiment of the present invention.

A memory controller 120 of the memory system 100 may reconfigure peak power management information as the second peak power management information PPM_INFO_2 determined in FIG. 6 if it is determined, at a second time TIME_2 after a first time TIME_1, that the operation information OP_INFO and the environment information ENV_INFO at the second time TIME_2 correspond to the operation information OP_INFO "A" and the environment information ENV_INFO "B" at the first time TIME_1 described with reference to FIG. 6.

Criteria for the memory controller 120 to determine whether or not the operation information OP_INFO and environment information ENV_INFO at the second time TIME_2 correspond to the operation information OP_INFO and environment information ENV_INFO at the first time TIME_1 may be determined in any of various ways.

For example, if the operation information OP_INFO at the first time TIME_1 matches the operation information OP_INFO at the second time TIME_2, and if the difference between the environment information ENV_INFO at the first time TIME_1 and the environment information ENV_INFO at the second time TIME_2 falls within a set range, the memory controller 120 may determine that the operation information OP_INFO and the environment information ENV_INFO at the second time TIME_2 correspond to the operation information OP_INFO and the environment information ENV_INFO at the first time TIME_1.

For another example, when both the operation information OP_INFO at the first time TIME_1 and the operation information OP_INFO at the second time TIME_2 indicate a read operation, when the difference between the temperature information at the first time TIME_1 and the temperature information at the second time TIME_2 is within a set range (e.g., 5 degrees C.), when the operation speed of the host at the first time TIME_1 and the operation speed of the host at the second time TIME_2 are within a set range (e.g., 100 MHz), and when the level of power at the first time TIME_1 and the level of power at the second time TIME_2 are within a set range (e.g., 2.2V to 2.4V), the memory controller 120 may determine that the operation information OP_INFO and the environment information ENV_INFO at the second time TIME_2 correspond to the operation information OP_INFO and the environment information ENV_INFO at the first time TIME_1.

Hereinafter, the operation of the memory system 100 described with reference to FIGS. 5 to 7 is described using a flowchart shown in FIG. 8.

Figure 8:
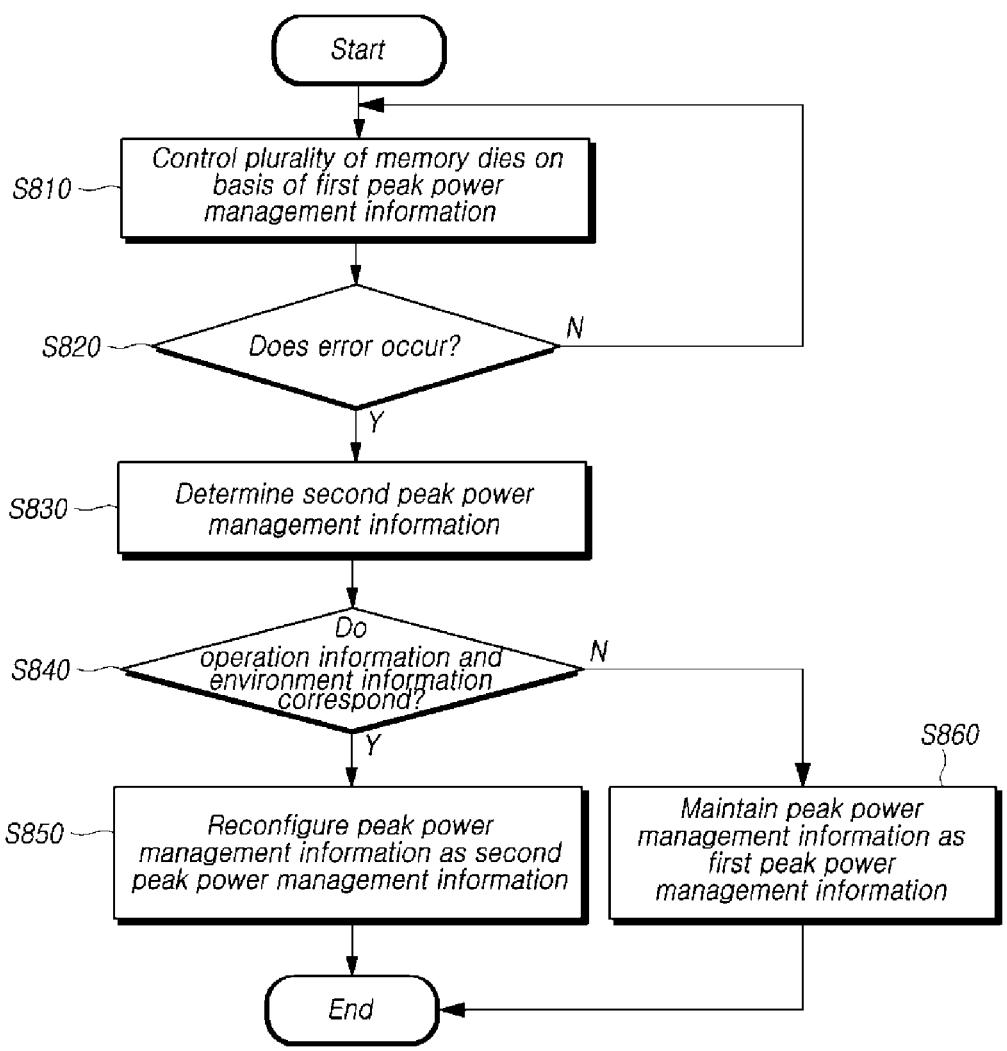
FIG. 8 is a flowchart illustrating an example of an operation in which a memory system controls a plurality of memory dies, according to an embodiment of the present disclosure.

FIG. 8 is a flowchart illustrating an example of an operation in which a memory system 100 controls a plurality of memory dies, according to an embodiment of the present disclosure.

First, a memory controller 120 of the memory system 100 may control a plurality of memory dies on the basis of first peak power management information PPM_INFO_1 after the peak power management information is configured as the first peak power management information (S810).

In addition, the memory controller 120 may determine whether or not an error occurs while controlling a plurality of memory dies on the basis of the first peak power management information PPM_INFO_1 (S820).

If no error occurs (S820-N), the memory controller 120 may continue to control the plurality of memory dies on the basis of the first peak power management information PPM_INFO_1.

On the other hand, when an error occurs (S820-Y), the memory controller 120 may determine second peak power management information PPM_INFO_2, which is different from the first peak power management information PPM_INFO_1 (S830).

Thereafter, the memory controller 120 determines whether or not the operation information and the environment information at the second time correspond to the operation information and the environment information at the first time at which the error occurs (S840).

If it is determined that the operation information and the environment information at the second time correspond to the operation information and the environment information at the first time at which the error occurs (S840-Y), the memory controller 120 may change or update the peak power management information to reflect the second peak power management information PPM_INFO_2 that is determined in step S830 (S850).

On the other hand, if it is determined that the operation information and the environment information at the second time do not correspond to the operation information and the environment information at the first time at which the error occurs (S840-N), the memory controller 120 may maintain the first peak power management information PPM_INFO_1 (S860).

Hereinafter, an example of the above-described peak power management information is described, and a specific operation in which the memory system 100 controls respective memory dies according to the peak power management information is described.

FIG. 9 is a diagram illustrating an example of peak power management information according to an embodiment of the present disclosure.

Referring to FIG. 9, the peak power management information may indicate the value of a current that can be consumed by a single memory die in the time during which a specific operation is performed. The power consumed by the memory die is determined by the value of the current consumed by the memory die and the time of such consumption. Therefore, the peak power management information indicates the value of the current that can be consumed by the memory die over time such that the memory system 100 is able to control the power consumed by the memory die.

For example, for a read operation, the peak power management information may indicate the value of a current consumed by the memory die during the time in which the read operation is performed. In FIG. 9, when performing the read operation, the peak power management information may indicate that the memory die consumes a current of 120 mA from 0 us to 30 us of the read operation, a current of 90 mA for the next 20 us of the read operation, i.e., from 30 us to 50 us, a current of 80 mA from 50 us to 75 us of the read operation, and a current of 70 mA thereafter until the read operation is completed.

In addition, for a write operation, the peak power management information may indicate the value of a current consumed by a memory die during the time in which the write operation is performed. As in the case of the read operation, the current is indicated for each of multiple time periods of the total operation. In FIG. 9, when performing the write operation, the peak power management information may indicate that the memory die consumes a current of 140 mA from 0 us to 60 us, a current of 95 mA from 60 us to 90 us, a current of 85 mA from 90 us to 115 us, and a current of 60 mA thereafter until the write operation is completed.

In addition, for an erase operation, the peak power management information may indicate the value of a current consumed by a memory die during the time in which the erase operation is performed. In FIG. 9, when performing the erase operation, the peak power management information may indicate that the memory die consumes a current of 130 mA from 0 us to 200 us, a current of 105 mA from 200 us to 300 us, a current of 90 mA from 300 us to 400 us, and a current of 75 mA thereafter until the erase operation is completed.

Hereinafter, the two pieces of the peak power management information described above in FIGS. 5 to 8, that is, the first peak power management information PPM_INFO_1 and the second peak power management information PPM_INFO_2 are compared with each other.

Figure 10:
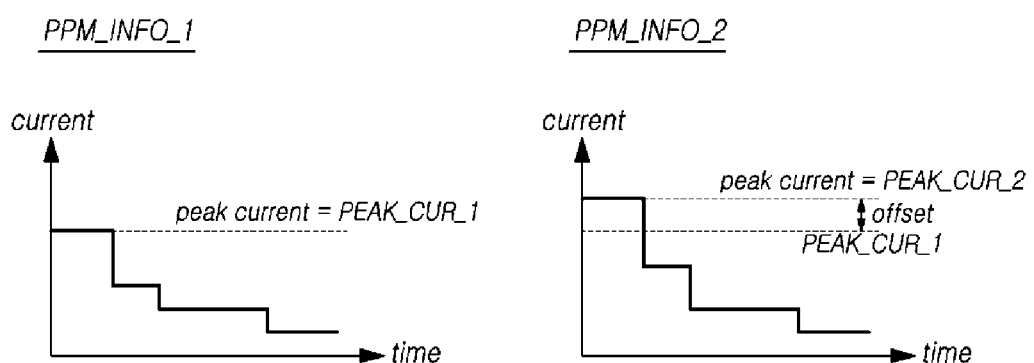
FIG. 10 is a diagram illustrating comparison between first peak power management information and second peak power management information according to an embodiment of the present disclosure.

FIG. 10 is a diagram illustrating comparison between first peak power management information PPM_INFO_1 and second peak power management information PPM_INFO_2 according to an embodiment of the present disclosure.

As described above, the first peak power management information PPM_INFO_1 and the second peak power management information PPM_INFO_2 may indicate values of the current that can be consumed by a single memory die during the time in which an operation, e.g., a read operation/a write operation/an erase operation, is performed on that die. In addition, the value of the current that can be consumed by a single memory die over time may be expressed as a graph of current with respect to time as shown in FIG. 10.

It is assumed that the value of a peak current usable for a single memory die, that is, the maximum value of the current in the first peak power management information PPM_INFO_1, is a first peak current PEAK_CUR_1, and the value of a peak current usable for a single memory die in the second peak power management information PPM_INFO_2 is a second peak current PEAK_CUR_2.

In this case, the value of the second peak current PEAK_CUR_2 is greater than the value of the first peak current PEAK_CUR_1 by a set difference. In other words, the memory controller 120 may determine the second peak power management information such that the value of the second peak current PEAK_CUR_2, which is a peak current usable for each memory die when controlling a plurality of memory dies on the basis of the second peak power management information PPM_INFO_2, is greater than the value of the first peak current PEAK_CUR_1, which is a peak current usable for each memory die when controlling a plurality of memory dies on the basis of the first peak power management information PPM_INFO_1, by the set difference.

For example, it is assumed that the first peak current PEAK_CUR_1 is 120 mA and the set difference is 20 mA. In this case, the memory controller 120 may determine the second peak power management information PPM_INFO_2 such that the second peak current PEAK_CUR_2 is 120 mA+20 mA=140 mA.

The reason why the memory controller 120 increases the value of the peak current usable for one memory die in the second peak power management information PPM_INFO_2 is due to the high probability that the value of the current used by one memory die at the time of determining the second peak power management information PPM_INFO_2, that is, at the time at which an error occurs, is greater than the value of the peak current usable for one memory die in the first peak power management information PPM_INFO_1.

In this case, the memory controller 120 may determine the second peak power management information PPM_INFO_2 such that the maximum number of memory dies that can be simultaneously operated by a peak current when controlling memory dies on the basis of the second peak power management information PPM_INFO_2 is less than the maximum number of memory dies that can be simultaneously operated by a peak current when controlling memory dies on the basis of the first peak power management information PPM_INFO_1.

When the memory controller 120 controls memory dies on the basis of the second peak power management information PPM_INFO_2, the value of the peak current usable for one memory die increases. Accordingly, if there are many memory dies that can be simultaneously operated by a peak current, the total power consumed by those memory dies significantly increases, which may cause malfunction of the memory system 100. Therefore, in order to prevent a significant increase in the power consumed by the memory dies being operated, the memory controller 120 is required to adjust the maximum value of the current usable for the memory dies to a specific value or less. To this end, the memory controller 120 may reduce the maximum number of memory dies that can be simultaneously operated by the peak current.

As described above, the memory controller 120 may adjust the maximum number of memory dies that can be simultaneously operated by the peak current when a specific operation (e.g., a read operation/a write operation/an erase operation) is performed, thereby preventing an instantaneous consumption of power above a reference value by all of the memory dies. As a result, the memory controller 120 may minimize the probability of occurrence of errors due to instantaneous consumption of power above a reference value when a specific operation (e.g., a read operation/a write operation/an erase operation) is performed.

Figure 11:
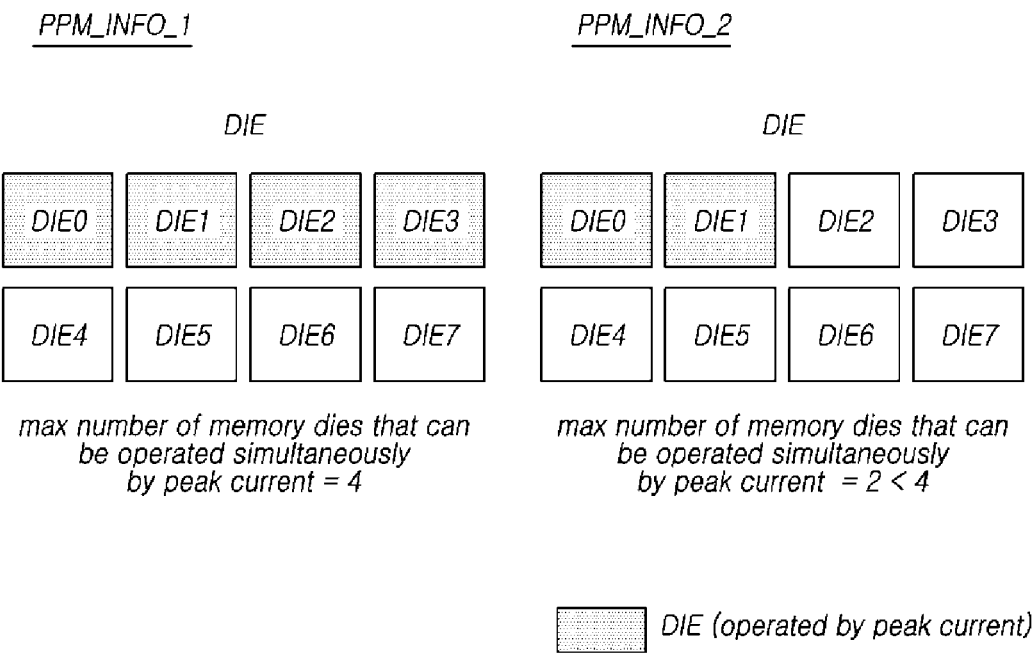
FIG. 11 is a diagram illustrating an example of the maximum number of memory dies that can be simultaneously operated by a peak current in a memory system according to an embodiment of the present disclosure.

FIG. 11 is a diagram illustrating an example of the maximum number of memory dies that can be simultaneously operated by a peak current in a memory system 100 according to an embodiment of the present disclosure.

In FIG. 11, it is assumed that a memory controller 120 of the memory system 100 controls eight memory dies DIE0-DIE7.

When the memory controller 120 controls of the eight memory dies on the basis of first peak power management information PPM_INFO_1, the number of memory dies that can be simultaneously operated by a peak current may be four. The memory controller 120 may perform control such that specific operations (e.g., read operations) are simultaneously performed on the four memory dies DIE0-DIE3.

When the memory controller 120 controls the memory dies on the basis of second peak power management information PPM_INFO_2, the number of memory dies that can be simultaneously operated by a peak current may be two, i.e., less than the number of dies that can be simultaneously operated on the basis of PPM_INFO_1. The memory controller 120 may control such that specific operations (e.g., read operations) are simultaneously performed on the two memory dies DIE0-DIE1.

Hereinafter, the operation in which the memory system 100 controls respective memory dies in the case where the maximum number of memory dies that can be simultaneously operated by a peak current differs from that shown in FIG. 11 is described with reference to FIGS. 12a to 13d.

FIGS. 12a to 12c are diagrams illustrating an example in which a memory system 100 controls a plurality of memory dies on the basis of first peak power management information PPM_INFO_1, according to an embodiment of the present disclosure.

Firstly, as shown in FIG. 12a, a memory controller 120 of the memory system 100 controls four memory dies DIE0-DIE3 among the eight memory dies DIE0-DIE7 described in FIG. 11 so as to operate simultaneously. The four memory dies DIE0-DIE3 consume a peak current during the time from 0 to T1. At this time, the memory controller 120 controls such that the remaining four memory dies DIE4-DIE7 do not operate during the time from 0 to T1. This is due to the fact that if the remaining four memory dies DIE4-DIE7 operate during the time from 0 to T1, the total power consumed by the eight memory dies DIE0-DIE7 during the time from 0 to T1 exceeds a set reference value, thereby significantly increasing the total power consumed by all of the memory dies DIE0-DIE7.

In addition, the four memory dies DIE0-DIE3 consume a current less than the peak current during the time from T1 to T2. Thus, the memory controller 120 may perform control such that one or more of the memory dies DIE4-DIE7 operate within a range in which the total power consumed by the eight memory dies DIE0-DIE7 does not exceed an allowable reference value. For example, as shown in FIG. 12b, the memory controller 120 may perform control such that the memory dies DIE4-DIE5 operate after T1.

In addition, the four memory dies DIE0-DIE3 consume a current, which is less than the current consumed during the time from T1 to T2, during the time after T2. Therefore, the memory controller 120 may perform control such that one or more of the remaining memory dies DIE6-DIE7 that have not yet operated within a range in which the total power consumed by the eight memory dies DIE0-DIE7 does not exceed an allowable reference value. For example, as shown in FIG. 12c, the memory controller 120 may perform control such that the memory dies DIE6-DIE7 operate after T2.

FIGS. 13a to 13d are diagrams illustrating another example in which a memory system 100 controls the operation of a plurality of memory dies on the basis of second peak power management information PPM_INFO_2, according to an embodiment of the present disclosure.

Figure 13A:
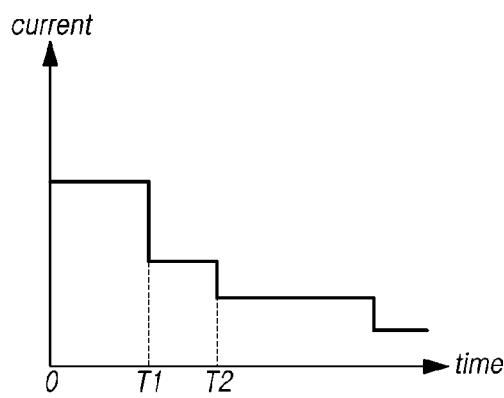
FIGS. 13a to 13d are diagrams illustrating another example in which a memory system controls a plurality of memory dies on the basis of second peak power management information, according to an embodiment of the present disclosure.

First, in FIG. 13a, a memory controller 120 of the memory system 100 performs control such that two memory dies DIE0-DIE1, among the eight memory dies DIE0-DIE7 described in FIG. 11, operate simultaneously. The two memory dies DIE0-DIE1 consume a peak current during the time from 0 to T1. At this time, the memory controller 120 performs control such that the remaining six memory dies DIE2-DIE7 do not operate during the time from 0 to T1.

Figure 13B:
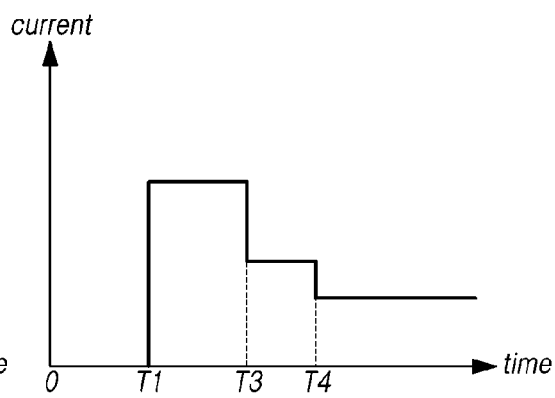

In addition, the two memory dies DIE0-DIE1 consume a current less than the peak current during the time from T1 to T2. Thus, the memory controller 120 may perform control such that one or more of the memory dies DIE2-DIE7 operate within a range in which the total power consumed by the eight memory dies DIE0-DIE7 does not exceed an allowable reference value. For example, as shown in FIG. 13b, the memory controller 120 may perform control such that the memory dies DIE2-DIE3 operate after T1.

Figure 13C:
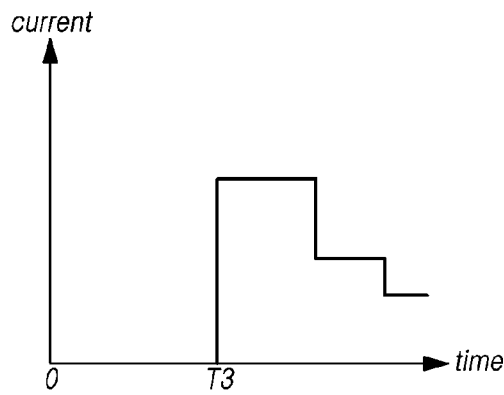

In addition, the two memory dies DIE2-DIE3 consume a current less than the peak current during the time from T3 to T4. Thus, the memory controller 120 may perform control such that one or more of the memory dies DIE4-DIE7 that have not yet operated further operate. For example, as shown in FIG. 13c, the memory controller 120 may perform control such that the memory dies DIE4-DIE5 operate after T3.

Figure 13D:
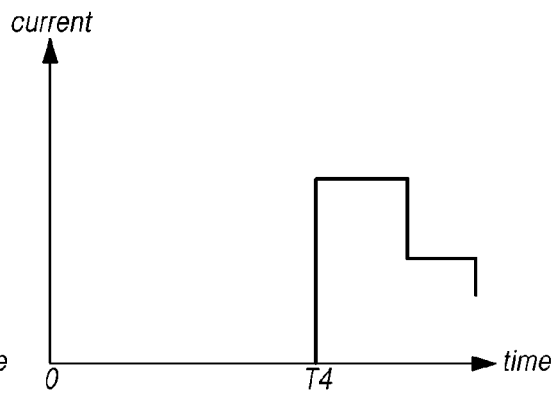

In addition, the two memory dies DIE2-DIE3 consume a current, which is less than the current consumed during the time from T3 to T4, after T4. Accordingly, the memory controller 120 may perform control such that one or more of the memory dies DIE6-DIE7 that have not yet operated further operate. For example, as shown in FIG. 13d, the memory controller 120 may perform control such that the memory dies DIE6-DIE7 operate after T4.

Figure 14:
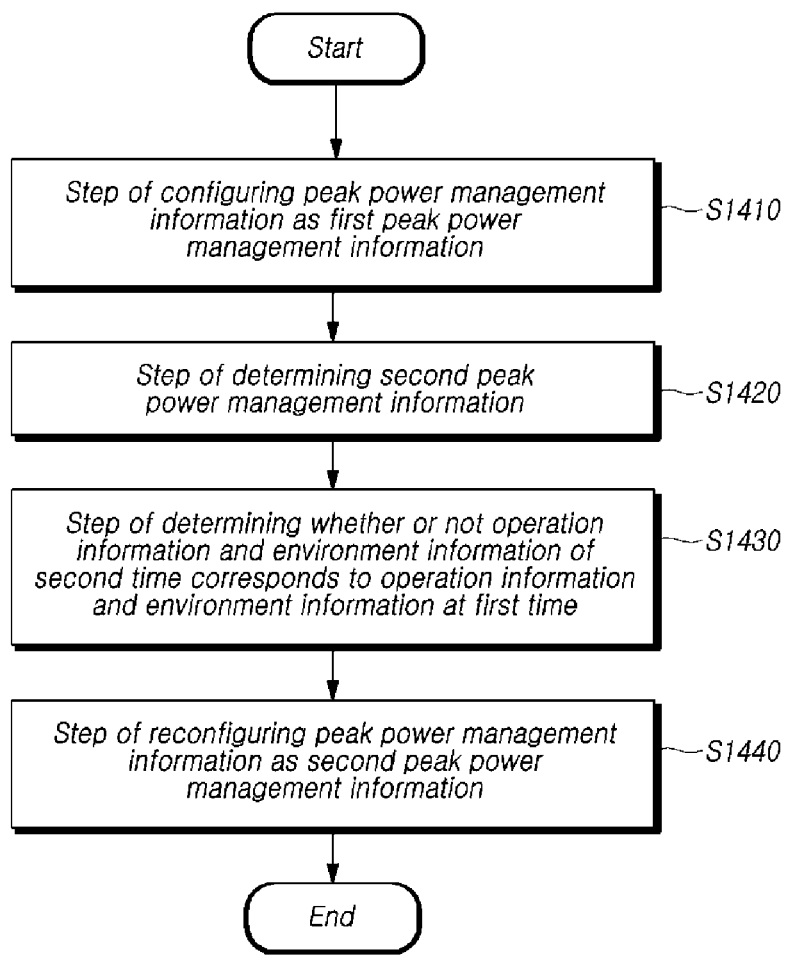
FIG. 14 is a flowchart illustrating a method for operating a memory system according to an embodiment of the present disclosure.

FIG. 14 is a flowchart illustrating a method for operating a memory system 100 according to an embodiment of the present disclosure.

Such method may include a step of configuring peak power management information for controlling a plurality of memory dies as first peak power management information PPM_INFO_1 (S1410).

In addition, the method for operating the memory system 100 may include a step of, when an error occurs while controlling the plurality of memory dies on the basis of the first peak power management information PPM_INFO_1, determining second peak power management information PPM_INFO_2 corresponding to operation information OP_INFO and environment information ENV_INFO at the time at which the error occurs (S1420).

In step S1420, the second peak power management information PPM_INFO_2 may be determined such that the value of a second peak current PEAK_CUR_2, which is a peak current usable for each memory die when controlling the plurality of memory dies on the basis of the second peak power management information PPM_INFO_2, is greater than the value of a first peak current PEAK_CUR_1, which is a peak current usable for each memory die when controlling the plurality of memory dies on the basis of the first peak power management information PPM_INFO_1.

In step S1420, the second peak power management information PPM_INFO_2 may be determined such that the maximum number of memory dies that can be simultaneously operated by a peak current when controlling memory dies on the basis of the second peak power management information PPM_INFO_2 is less than the maximum number of memory dies that can be simultaneously operated by a peak current when controlling memory dies on the basis of the first peak power management information PPM_INFO_1.

In addition, the method for operating the memory system 100 may include a step of determining, at the second time TIME_2 after a first time TIME_1 at which the above-described error occurs, whether or not the operation information OP_INFO and the environment information ENV_INFO of the second time TIME_2 correspond to the operation information OP_INFO and the environment information ENV_INFO at the first time TIME_1 (S1430).

In addition, the method for operating the memory system 100 may include a step of reconfiguring the peak power management information as the second peak power management information PPM_INFO_2 if it is determined that the operation information OP_INFO and the environment information ENV_INFO of the second time TIME_2 correspond to the operation information OP_INFO and the environment information ENV_INFO at the first time TIME_1 (S1440).

The operation of the memory controller 120 described above may be controlled by the control circuit 123, and may be performed by a method in which the processor 124 executes (or drives) firmware in which all the operations of the memory controller 120 are programmed.

Figure 15:
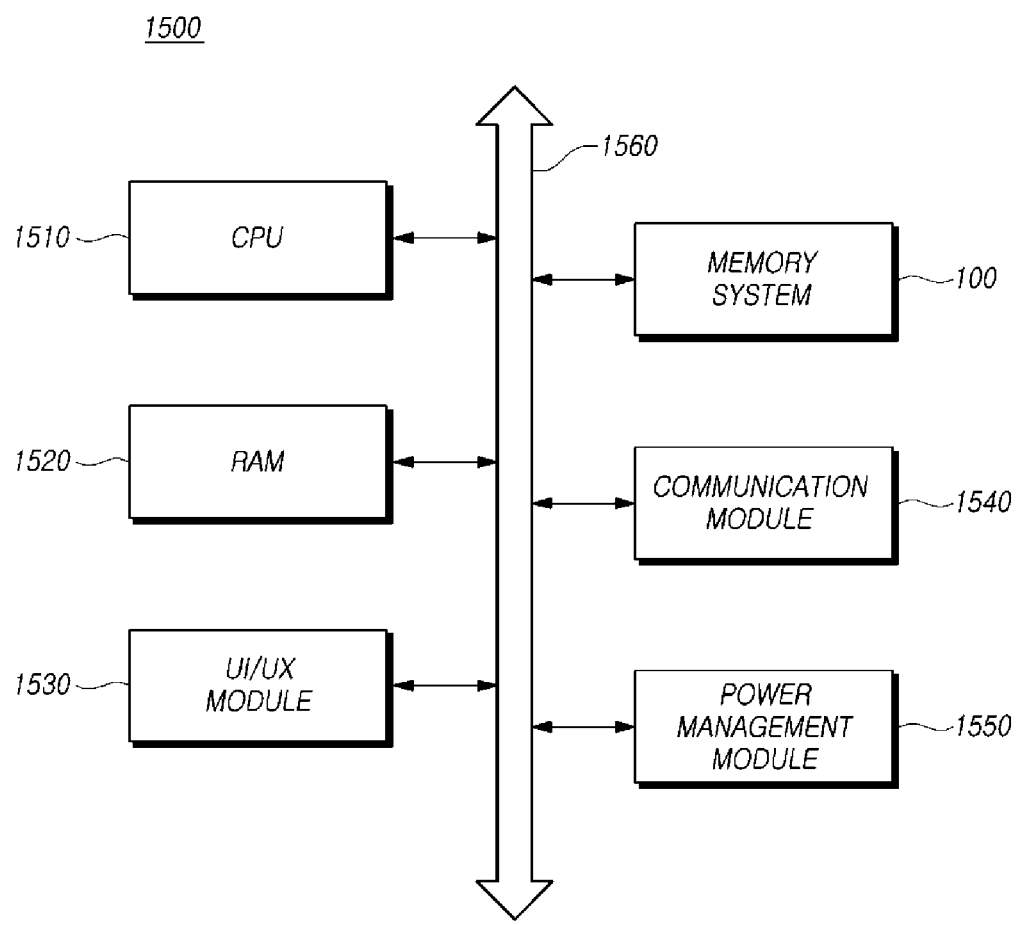
FIG. 15 is a diagram illustrating a configuration of a computing system according to an embodiment of the present disclosure.

FIG. 15 is a diagram illustrating the configuration of a computing system 1500 according to an embodiment of the present disclosure.

Referring to FIG. 15, the computing system 1500 may include: a memory system 100 electrically connected to a system bus 1560; a central processing unit (CPU) 1510 configured to control overall operation of the computing system 1500; a random access memory (RAM) 1520 configured to store data and information related to operations of the computing system 1500; a user interface/user experience (UI/UX) module 1530 configured to provide the user with a user environment; a communication module 1540 configured to communicate with an external device in a wired and/or wireless type; and a power management module 1550 configured to manage power used by the computing system 1500.

The computing system 1500 may be a personal computer (PC) or may include a mobile terminal such as a smartphone, a tablet or any of various other electronic devices.

The computing system 1500 may further include a battery for supplying an operating voltage, an application chipset, a graphic-related module, a camera image processor (CIS), and a dynamic random access memory (DRAM). As those skilled in the art will understand, the computing system 1500 may include other elements as well.

The memory system 100 may be implemented as a device configured to store data in a magnetic disk such as a hard disk drive (HDD), or a device configured to store data in a nonvolatile memory such as a solid state drive (SSD), a universal flash storage device, or an embedded MMC (eMMC) device. Examples of a non-volatile memory include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of various types of storage devices, any of which may be mounted inside any of a wide variety of electronic devices.

According to embodiments of the present disclosure described above, operation delay time of the memory system may be minimized. In addition, according to an embodiment of the present disclosure, overhead occurring in the process of calling a specific function may be minimized. Although various embodiments of the present disclosure have been illustrated and described, those skilled in the art will appreciate that various modifications, additions and substitutions are possible, without departing from the scope and spirit of the disclosure as disclosed in the accompanying claims. Therefore, embodiments of the present disclosure have been described to enable those skilled in the art to practice the invention, not to limit it. The present invention encompasses all variations and modifications that fall within the scope of the claims.

What is claimed is:

1. A memory system comprising:
   a plurality of memory dies; and
   a memory controller configured to control the plurality of memory dies based on a peak power management information used to manage a peak power that is the maximum value of power consumed by the respective memory dies, wherein the memory controller is configured to:
   configure first peak power management information for controlling the plurality of memory dies;
   when an error occurs while controlling the plurality of memory dies on the basis of the first peak power management information, determine second peak power management information corresponding to operation information and environment information at a first time, which is the time at which the error occurs, respectively; and
   when it is determined, at a second time after the first time, that operation information and environment information at the second time correspond to operation information and environment information, respectively, at the first time, change from the first peak power management information to the second peak power management information.

2. The memory system of claim 1, wherein the error is an error that occurs during an operation of transmitting commands or data to a host, or during an operation of receiving commands or data from the host.

3. The memory system of claim 1, wherein the environment information comprises at least one of temperature information, operation speed information of a host, and power level information.

4. The memory system of claim 3, wherein the operation information indicates one of a read operation, a write operation, and an erase operation.

5. The memory system of claim 1, wherein the memory controller determines the second peak power management information such that a value of a second peak current, which is a peak current usable for each memory die when controlling the plurality of memory dies on the basis of the second peak power management information, is greater than a value of a first peak current, which is a peak current usable for each memory die when controlling the plurality of memory dies on the basis of the first peak power management information.

6. The memory system of claim 5, wherein the memory controller determines the second peak power management information such that the maximum number of memory dies that can be simultaneously operated by a peak current when controlling the plurality of memory dies on the basis of the second peak power management information is less than the maximum number of memory dies that can be simultaneously operated by a peak current when controlling the plurality of memory dies on the basis of the first peak power management information.

7. The memory system of claim 1, wherein, when operation information at the first time matches operation information at the second time, and when a difference between environment information at the first time and environment information at the second time falls within a set range, the memory controller determines that the operation information and the environment information at the second time correspond to the operation information and the environment information, respectively, at the first time.

8. A memory controller comprising:
   a memory interface configured to communicate with a plurality of memory dies; and
   a control circuit configured to control the plurality of memory dies based on a peak power management information used to manage a peak power that is the maximum value of power consumed by the respective memory dies, wherein the control circuit is configured to:
   configure first peak power management information for controlling the plurality of memory dies;
   when an error occurs while controlling the plurality of memory dies on the basis of the first peak power management information, determine second peak power management information corresponding to operation information and environment information, respectively, at a first time, which is the time at which the error occurs; and
   when it is determined, at a second time after the first time, that operation information and environment information at the second time correspond to operation information and environment information at the first time, respectively, change from the first peak power management information to the second peak power management information.

9. The memory controller of claim 8, wherein the error is an error that occurs during an operation of transmitting commands or data to a host, or during an operation of receiving commands or data from the host.

10. The memory controller of claim 8, wherein the environment information comprises at least one of temperature information, operation speed information of a host, and power level information.

11. The memory controller of claim 10, wherein the operation information indicates one of a read operation, a write operation, and an erase operation.

12. The memory controller of claim 8, wherein the control circuit determines the second peak power management information such that a value of a second peak current, which is a peak current usable for each memory die when controlling the plurality of memory dies on the basis of the second peak power management information, is greater than a value of a first peak current, which is a peak current usable for each memory die when controlling the plurality of memory dies on the basis of the first peak power management information.

13. The memory controller of claim 12, wherein the control circuit determines the second peak power management information such that the maximum number of memory dies that can be simultaneously operated by a peak current when controlling the plurality of memory dies on the basis of the second peak power management information is less than the maximum number of memory dies that can be simultaneously operated by a peak current when controlling the plurality of memory dies on the basis of the first peak power management information.

14. The memory controller of claim 13, wherein when operation information at the first time matches operation information at the second time, and when a difference between environment information at the first time and environment information at the second time falls within a set range, the control circuit determines that the operation information and the environment information at the second time correspond to the operation information and the environment information, respectively, at the first time.

15. A method for operating a memory system, the method comprising:
    configuring first peak power management information for controlling the plurality of memory dies, wherein at least the first peak power management information is based on peak power management information used to manage a peak power that is a maximum value of power consumed by the respective memory dies;
    when an error occurs while controlling the plurality of memory dies on the basis of the first peak power management information, determining second peak power management information corresponding to operation information and environment information at a first time, which is the time at which the error occurs;
    determining, at a second time after the first time, whether or not operation information and environment information at the second time correspond to operation information and environment information, respectively, at the first time; and
    when it is determined that the operation information and the environment information at the second time correspond to the operation information and the environment information, respectively, at the first time, changing from the first peak power management information to the second peak power management information.

16. The method of claim 15, wherein the determining of the second peak power management information comprises determining the second peak power management information such that a value of a second peak current, which is a peak current usable for each memory die when controlling the plurality of memory dies on the basis of the second peak power management information, is greater than a value of a first peak current, which is a peak current usable for each memory die when controlling the plurality of memory dies on the basis of the first peak power management information.

17. The method of claim 16, wherein the determining of the second peak power management information comprises determining the second peak power management information such that the maximum number of memory dies that can be simultaneously operated by a peak current when controlling the plurality of memory dies on the basis of the second peak power management information is less than the maximum number of memory dies that can be simultaneously operated by a peak current when controlling the plurality of memory dies on the basis of the first peak power management information.

* * * * *